US006937227B2

(12) United States Patent
Qamhiyah et al.

(10) Patent No.: US 6,937,227 B2
(45) Date of Patent: Aug. 30, 2005

(54) HAND-HELD POINTING DEVICE (75) Inventors: Abir Ziyad Qamhiyah, Ames, IA (US);
Donald Flugrad, Ames, IA (US);
Hekmat Tahseen Qamhieh, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 10/619,823

(22) Filed: Jul. 14, 2003

(65) Prior Publication Data

US 2005/0012712 A1 Jan. 20, 2005

(51) Int. Cl.[7] .................................................. G09G 5/08
(52) U.S. Cl. ....................................... 345/157; 345/156
(58) Field of Search ................................. 345/156, 157, 345/158–173, 856, 857; 200/6; 338/185; 463/38; 700/85

(56) References Cited

U.S. PATENT DOCUMENTS

| | | | |
|---|---|---|---|
| 4,944,095 A | | 7/1990 | Anglehart |
| 5,012,231 A | | 4/1991 | Felsenstein |
| 5,376,946 A | | 12/1994 | Mikan |
| 5,428,367 A | | 6/1995 | Mikan |
| 5,432,530 A | | 7/1995 | Arita et al. |
| 5,453,759 A | | 9/1995 | Seebach |
| 5,455,556 A | * | 10/1995 | Ohm et al. ................. 338/114 |
| 5,489,922 A | | 2/1996 | Zloof |
| 5,533,141 A | | 7/1996 | Futatsugi et al. |
| 5,571,997 A | | 11/1996 | Gray et al. |
| 5,629,500 A | | 5/1997 | Fukuzaki et al. |
| 5,659,334 A | | 8/1997 | Yaniger et al. |
| 5,661,269 A | | 8/1997 | Fukuzaki et al. |
| 5,672,852 A | | 9/1997 | Fukuzaki et al. |
| 5,679,930 A | | 10/1997 | Katsurahira |
| 5,687,080 A | * | 11/1997 | Hoyt et al. .................... 700/85 |

(Continued)

FOREIGN PATENT DOCUMENTS

JP 410301706 A * 11/1998

OTHER PUBLICATIONS

Arifin, "Computer–aided design of an ergonomic computer mouse," Mar. 4, 2003, Abstract from Master's Thesis in Mechanical Engineering (Iowa State University).
Peterson, "Gyration Ultra GT Review: Mousing in Air," Jun. 16, 2003, article from http://www.extremetech.com, printed Aug. 5, 2003.

*Primary Examiner*—Vijay Shankar
*Assistant Examiner*—Nitin Patel
(74) *Attorney, Agent, or Firm*—Fish & Richardson, P.C.

(57) ABSTRACT

The primary purpose of this thesis is to explain a device which could be used as an alternative for a computer mouse. Instead of using a regular roller found in an ordinary mouse, the device uses a pressure sensitive sensor to control the computer cursor on the monitor.

The device is developed mainly for a personal computer with Universal Serial Bus (USB) capability. The computer should have an operating system of Microsoft Windows 98 or newer. The device does not need any additional driver, and it has a USB hot-plug-and-play feature. It uses a Human Interface Device (HID) driver provided by Windows.

The device mainly has two buttons (right and left) and is approximately 4" by 3" by 2" in size. Users can press their fingers on to the device to control the cursor. The device will be small enough to be fit inside a person's palm. The area has four pressure sensors used to move the cursor to the left, right, upward and downward. The user can control some parameters, such as cursor movement rate, by just controlling the amount of force pressed on that area. The device will be made from a soft material with a hard box inside. All the necessary components will be placed inside the box. Only the sensors are outside the box, so that the user can control the sensors by squeezing the device. This would make it comfortable for users to operate the device.

25 Claims, 9 Drawing Sheets

U.S. PATENT DOCUMENTS

| Patent No. | Kind | Date | Inventor | Ref |
|---|---|---|---|---|
| 5,691,747 | A * | 11/1997 | Amano | 345/167 |
| 5,706,000 | A | 1/1998 | Fukuzaki et al. | |
| 5,714,984 | A | 2/1998 | Fukuzaki et al. | |
| 5,726,683 | A | 3/1998 | Goldstein et al. | |
| 5,738,325 | A | 4/1998 | Brown | |
| 5,788,203 | A | 8/1998 | Nitti | |
| 5,790,102 | A | 8/1998 | Nassimi | |
| 5,805,142 | A | 9/1998 | Byrne | |
| 5,805,144 | A | 9/1998 | Scholder et al. | |
| 5,844,548 | A | 12/1998 | Chen et al. | |
| 5,861,872 | A | 1/1999 | Stohr et al. | |
| 5,867,808 | A | 2/1999 | Selker et al. | |
| 5,868,365 | A | 2/1999 | Hesley | |
| 5,870,082 | A | 2/1999 | Selker et al. | |
| 5,883,617 | A | 3/1999 | Yoshikawa | |
| 5,883,619 | A | 3/1999 | Ho et al. | |
| 5,893,533 | A | 4/1999 | Hughes | |
| 5,894,302 | A | 4/1999 | Scenna et al. | |
| 5,896,124 | A | 4/1999 | Strandberg | |
| 5,898,136 | A | 4/1999 | Katsurahira | |
| 5,914,702 | A | 6/1999 | Derocher et al. | |
| 5,949,325 | A | 9/1999 | Devolpi | |
| 5,949,354 | A | 9/1999 | Chang | |
| 5,973,671 | A | 10/1999 | Kuo | |
| 5,977,959 | A | 11/1999 | Katsurahira et al. | |
| 6,005,555 | A | 12/1999 | Katsurahira et al. | |
| 6,018,334 | A | 1/2000 | Eckerberg et al. | |
| 6,084,572 | A | 7/2000 | Yaniger et al. | |
| 6,087,925 | A | 7/2000 | DeVolpi | |
| 6,166,722 | A | 12/2000 | Kawabe et al. | |
| 6,193,196 | B1 | 2/2001 | Hesley | |
| 6,208,328 | B1 | 3/2001 | Kawachiya et al. | |
| 6,236,034 | B1 | 5/2001 | DeVolpi | |
| 6,243,077 | B1 | 6/2001 | Manara et al. | |
| 6,278,440 | B1 | 8/2001 | Katsurahira et al. | |
| 6,304,247 | B1 * | 10/2001 | Black | 345/161 |
| 6,359,611 | B2 * | 3/2002 | Chan | 345/156 |
| 6,377,244 | B1 | 4/2002 | Reid et al. | |
| 6,389,632 | B1 | 5/2002 | Bergman | |
| 6,396,479 | B2 | 5/2002 | Gordon | |
| 6,437,682 | B1 * | 8/2002 | Vance | 338/185 |
| 6,441,805 | B1 | 8/2002 | Reid et al. | |
| 6,489,947 | B2 | 12/2002 | Hesley et al. | |
| 6,492,975 | B1 | 12/2002 | Weiss | |
| 6,509,890 | B1 | 1/2003 | May | |
| 6,529,186 | B1 | 3/2003 | Thayer | |
| 6,573,464 | B2 * | 6/2003 | Yen | 200/6 A |
| 6,724,366 | B2 * | 4/2004 | Crawford | 345/157 |
| 2003/0107556 | A1 * | 6/2003 | Yamashita | 345/173 |
| 2004/0012557 | A1 * | 1/2004 | Daniel | 345/156 |

\* cited by examiner

HAND-HELD POINTING DEVICE

TECHNICAL FIELD

This invention relates to pointing devices usable in computing systems.

BACKGROUND

Traditional pointing devices generally operate on flat surfaces. These devices are coupled directly to computing devices using wired or wireless connections. A user may use a traditional pointing device to move a pointer on a display screen coupled to the computing device. Generally, when the user moves the pointing device across the flat surface, the pointer will move in a corresponding direction on the screen. If the user moves the device more quickly, the pointer on the screen will generally move with a faster velocity. The user may also manipulate the device with one or more of their fingers to initiate right- or left-click operations. These operations may allow the user to drag objects on the screen or select items from a pull-down menu. Traditional pointing devices include both mechanical and optical mouse devices.

Another type of pointing device is a joystick. A user may also use this type of hand-held pointing device to move a pointer on a display screen. Typically, the user moves a pointer on a display screen by manipulating a stick with a finger and/or thumb. A strain gauge may be used to determine the direction of movement of the stick.

Still another type of pointing device is a force transducer located in the center of a computing keyboard used for determining the motion of a pointer on a display screen. The force transducer includes an elongated lever arm attached to a substrate. The substrate undergoes strain when a user applies force to the end of the lever arm. Strain gauges are used to measure the strain. The direction and speed of movement of the pointer on the display screen are thereby determined by the force applied by the user to the lever arm.

SUMMARY

Various implementations of the present invention are described herein. One implementation provides a hand-held device to control motion of a pointer on a display screen. In this implementation, the device includes a shell, a pressure sensor, and an actuator. The shell is capable of being held by a hand. The pressure sensor contains pressure-sensitive zones that are each associated with a direction of motion of the pointer on the display screen. The actuator is positioned to be manipulated by a digit (e.g., finger or thumb) of the hand holding the shell. When the actuator is manipulated, it presses against at least one of the pressure-sensitive zones to cause the pointer to move on the display screen in a direction determined by the direction of motion associated with the at least one of the pressure-sensitive zones against which the actuator is pressed.

Various implementations of the present invention may have many advantages. For example, continuous pointer steering may be achieved as a result of the pressure exerted by a finger or thumb on the actuator. As a result of the pressure exerted on the actuator, the pointer on the display screen may move in any direction, from 0 to 359 degrees. In addition, the speed of motion of the pointer may be determined by the intensity of the pressure exerted on the actuator, to allow a continuous range of speed. In certain implementations, the invention provides a hand-held device that does not require a work surface for its operation. In these implementations, the device fits in the palm of a hand, and may even be strapped across the back of the hand when typing. The device may even be interchanged for right and left hand operation without the need for any adjustments. In some implementations, the device includes a flexible shell covering.

The details of one or more implementations of the invention are set forth in the accompanying drawings and the description below. Other features, objects, and advantages will be apparent from the description and drawings, and from the claims.

DETAILED DESCRIPTION

Figure 1:
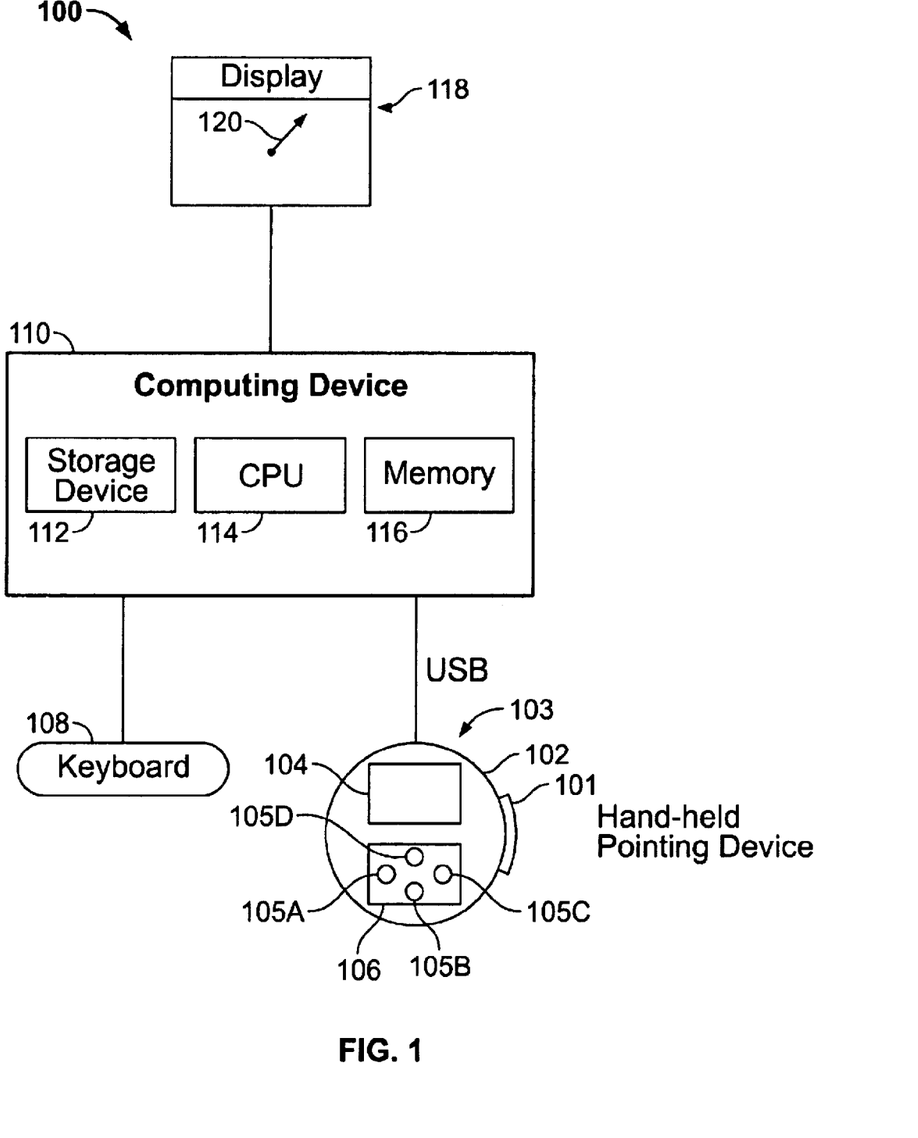
FIG. 1 is a block diagram of a computing system having a hand-held pointing device, according to one implementation.

FIG. 1 is a block diagram of a computing system having a hand-held pointing device, according to one implementation. In this implementation, a user is capable of holding a pointing device 102 in a hand and manipulating the pointing device 102 to control motion of a pointer 120 on a display screen 118 in a computing system 100. The hand-held pointing device 102 includes an exterior shell 103, a click button 101, an actuator 104, and a pressure sensor 106. The pressure sensor 106 contains multiple pressure-sensitive zones 105A, 105B, 105C, and 105D that are each associated with a direction of motion of the pointer 120. The actuator 104 is positioned to be manipulated by the user, such that when the user exerts pressure through the use of digit (e.g., thumb or finger), the actuator 104 presses against at least one of the pressure-sensitive zones 105A, 105B, 105C, or 105D to cause the pointer 120 to move on the display screen 118 in a direction determined by the direction of motion associated with the pressure-sensitive zones 105A, 105B, 105C, or 105D against which the actuator 104 is pressed.

In FIG. 1, the four pressure-sensitive zones 105A, 105B, 105C, and 105D are associated with the following directions of motion on the display screen 118: north, east, south, and west. A formation of four pressure-sensitive zones is also shown and described later in FIG. 2B. In another implementation, there are eight pressure-sensitive zones associated with the following directions of motion: north, northeast, east, southeast, south, southwest, west, and northwest.

If the actuator 104 presses against only one of the pressure-sensitive zones 105A, 105B, 105C, or 105D, then the pointer 120 will move on the display screen 118 in a direction directly associated with that zone. For example, if the zone is associated with the direction of north, then the pointer 120 will move in the direction of north. If, however, the actuator 104 presses against more than one of the pressure-sensitive zones 105A, 105B, 105C, or 105D, then the amount of pressure exerted upon each of the zones by the actuator 104 will be used to determine the direction of movement of the pointer 120. In one implementation, a vector calculation is used to determine the resultant direction of movement of the pointer 120 based on the individual component vectors that are determined from the amount of pressure exerted upon each of the pressure-sensitive zones 105A, 105B, 105C, and 105D. An example of such a vector calculation is shown and described later in FIG. 7A and FIG. 7B.

In one implementation, the amount of pressure exerted by the user upon the actuator 104 also determines the speed of movement of the pointer 120 on the display screen 118. When the user exerts pressure upon the actuator 104, the actuator 104 then exerts pressure upon one or more of the pressure-sensitive zones 105A, 105B, 105C, or 105D. The amount of this exerted pressure determines the speed of motion of the pointer 120. If more pressure is exerted, then the pointer 120 moves faster.

In one implementation, the pressure sensor 106 is a piezoresistive sensor whose resistance changes with pressure. Piezoresistive sensors do not require external power to operate, and they have low noise.

The hand-held pointing device 102 also includes a click button 101 coupled to the exterior shell 103. In one implementation, the click button 101 is a conventional rocker switch capable of providing both left- and right-click operations.

As shown in FIG. 1, the display screen 118, a keyboard 108, and the hand-held pointing device 102 are each coupled to the computing device 110. The hand-held pointing device 102 is coupled to the computing device 110 via a standard Universal Serial Bus (USB) connection. In other implementations, different interface types, such as a wireless interface, may be utilized. The computing device 110 includes a storage device 112, a central processing unit (CPU) 114, and a memory 116. The computing device 110 may use its standard human interface device (HID) drivers to communicate with the pointing device 102.

Figure 2A:
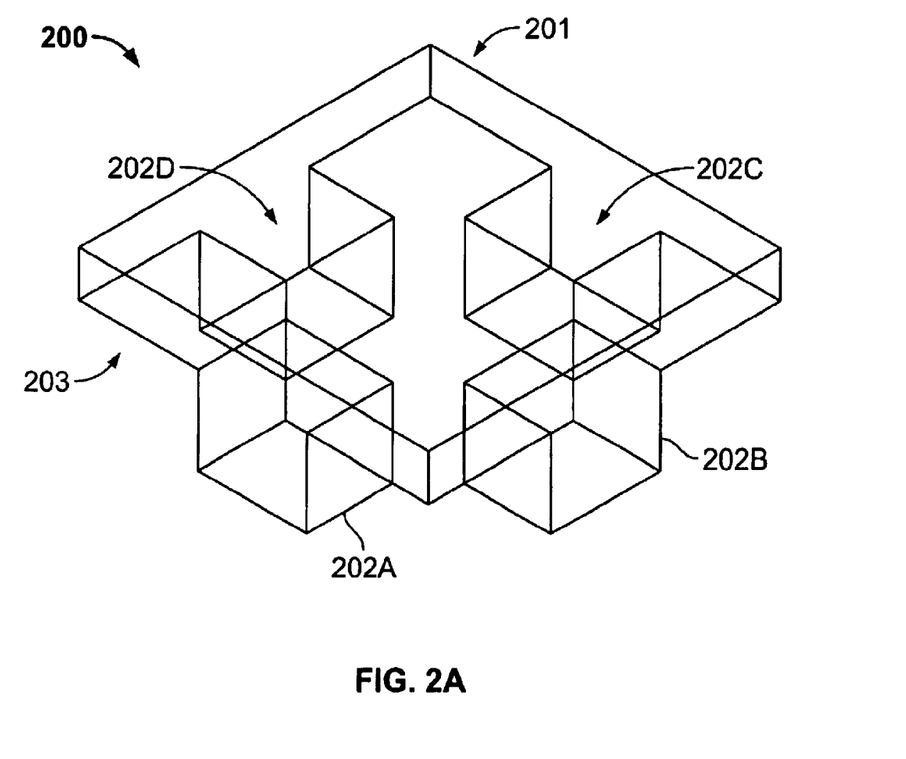
FIG. 2A is a three-dimensional view of an actuator, according to one implementation.

FIG. 2A is a three-dimensional view of an actuator, according to one implementation. In this implementation, the actuator 200 that is shown is one example of the actuator 104 shown in FIG. 1. In FIG. 2A, the actuator 200 has a substantially flat top surface 201 upon which pressure may be exerted by a user. For example, a user may press his or her thumb against the top surface 201 and cause the actuator 200 to swivel about a pivot point 204 (shown in FIG. 2B). The actuator 200 also includes protrusions 202A, 202B, 202C, and 202D on its bottom surface 203. As shown in the example in FIG. 2A, these protrusions are substantially cubical in shape, and extend downwardly from the bottom surface 203. The protrusions 202A, 202B, 202C, and 202D are equally spaced apart in a polygonal pattern, and each of these protrusions is capable of being coupled with a pressure-sensitive zone of a pressure sensor, such at those shown in FIG. 2B.

Figure 2B:
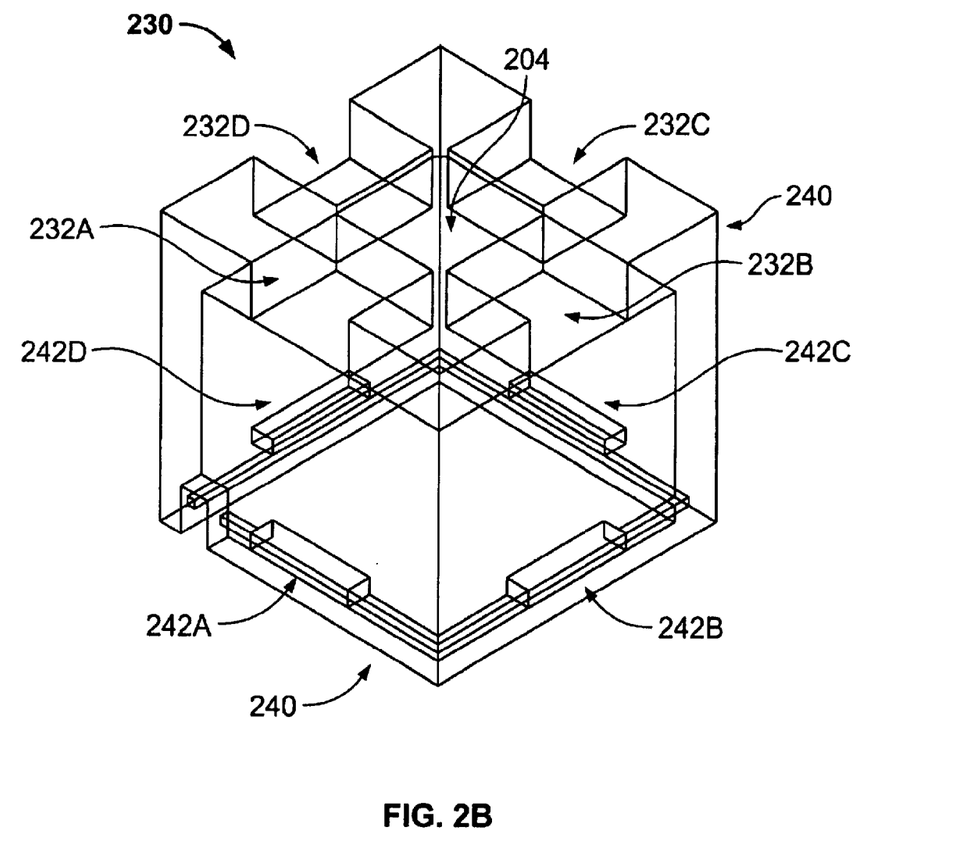
FIG. 2B is a three-dimensional view of a pressure-sensor assembly that contains a pressure sensor, according to one implementation.

FIG. 2B is a three-dimensional view of a pressure-sensor assembly that contains a pressure sensor, according to one implementation. In this implementation, the pressure-sensor assembly 230 contains a pressure sensor 240. The pressure-sensor assembly 230 is secured by the fasteners 242A, 242B, 242C, and 242D to the cover plate 240. The pressure sensor 240 is one example of the pressure sensor 106 shown in FIG. 1. The pressure sensor 240 contains pressure-sensitive zones 232A, 232B, 232C, and 232D, which are example of the pressure-sensitive zones 105A, 105B, 105C, and 105D shown in FIG. 1. In one implementation, these pressure-sensitive zones are located upon pressure-sensitive film used for detecting pressure. As shown in FIG. 2B, these pressure-sensitive zones 232A, 232B, 232C, and 232D are equally spaced-apart indentations that are capable of being coupled with the protrusions 202A, 202B, 202C, and 202D of the actuator 200 shown in FIG. 2A. As pressure is applied to the actuator 200, the actuator 200 is capable of swiveling about the pivot point 204 and coupling one or more of its protrusions 202A, 202B, 202C, or 202D with one or more of the pressure-sensitive zones 232A, 232B, 232C, or 232D and cause motion of a pointer, such as the pointer 120 on the display screen 118 shown in FIG. 1. The protrusions 202A, 202B, 202C, and 202D are positioned above the pressure-sensitive zones 232A, 232B, 232C, and 232D such that, when force is applied to the actuator 200, these protrusions may be pressed against the pressure-sensitive zones.

The direction of motion will be determined from the amount of pressure applied to the actuator 200, and from which of the pressure-sensitive zones 232A, 232B, 232C, or 232D are triggered. As an example, assume that zone 232A is associated with a direction of west, zone 232B is associated with a direction of south, zone 232C is associated with a direction of east, and zone 232D is associated with a direction of north. If pressure is applied to the actuator 200 such that only the protrusion 202A is pressed down upon the pressure-sensitive zone 232A, then the pointer on the display screen will move in a direction of due west. If, however, the protrusion 202A is pressed upon the zone 232A and the protrusion 202B is also pressed upon the zone 232B, then the pointer will move in a direction that is in between west and south. The precise direction of movement will be determined based upon the amount of pressure exerted upon the zone 232A relative to the zone 232B. In one implementation, a vector calculation is used to determine the precise direction of motion. In this implementation, when pressure is applied to the pressure sensor 240, a signal is generated for each of the pressure-sensitive zones 232A, 232B, 232C, and 232D according to the amount of pressure that is applied to these zones. The four generated signals are used to create four component vectors. The component vectors associated with the signals from each of the opposing pressure-sensitive zones are added to create two intermediate vectors. Thus, the component vectors for the pressure-sensitive zones 232A and 232C are added to create a first intermediate vector, and the component vectors for the pressure-sensitive zones 232B and 232D are added to create a second intermediate vectors. These two intermediate vectors are then added to create a final resultant vector, which indicates the precise direction of motion of the pointer on the display screen.

Figure 3A:
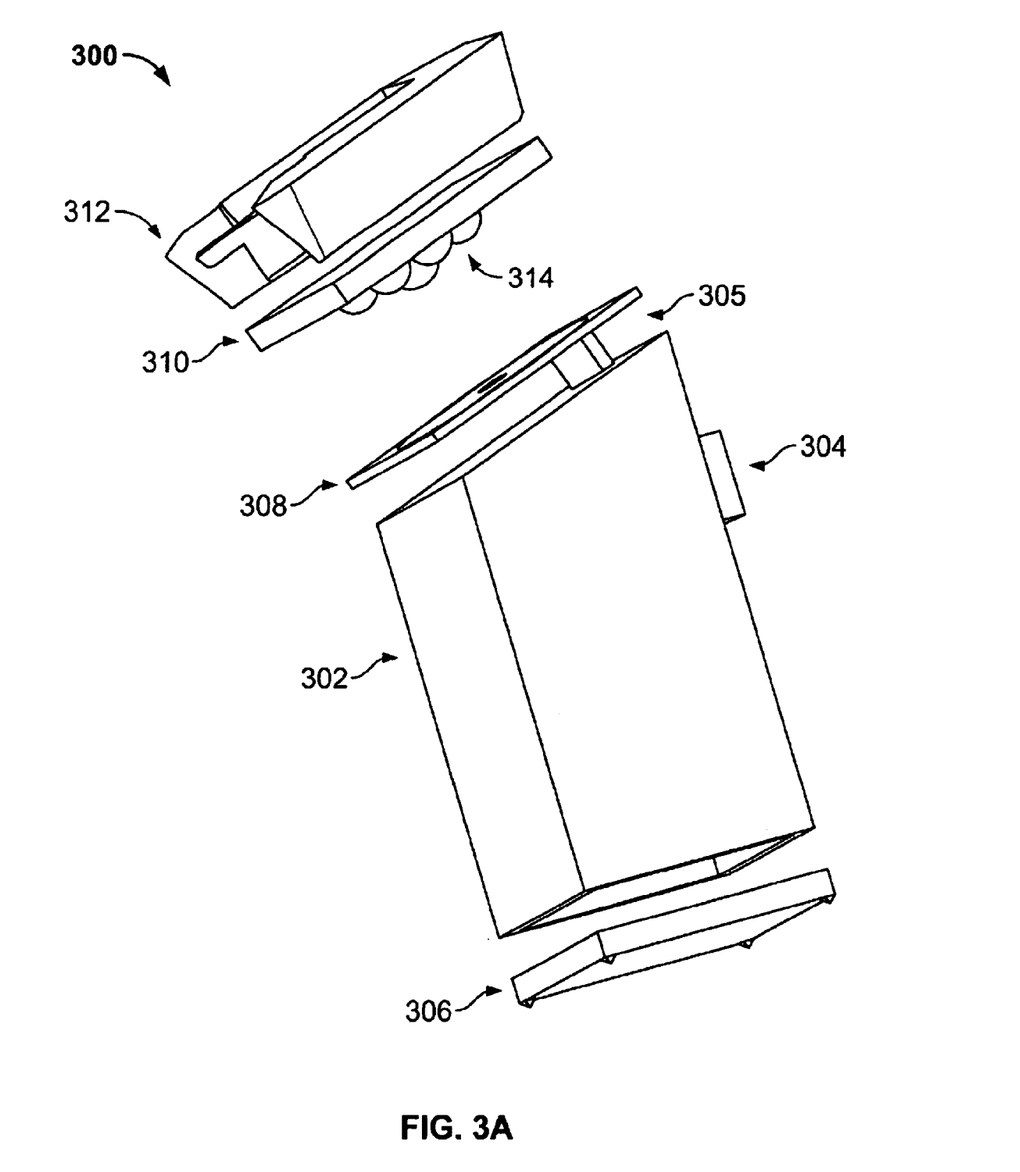
FIG. 3A is a three-dimensional view of a pointing device internal assembly, according to one implementation.
Figure 3B:
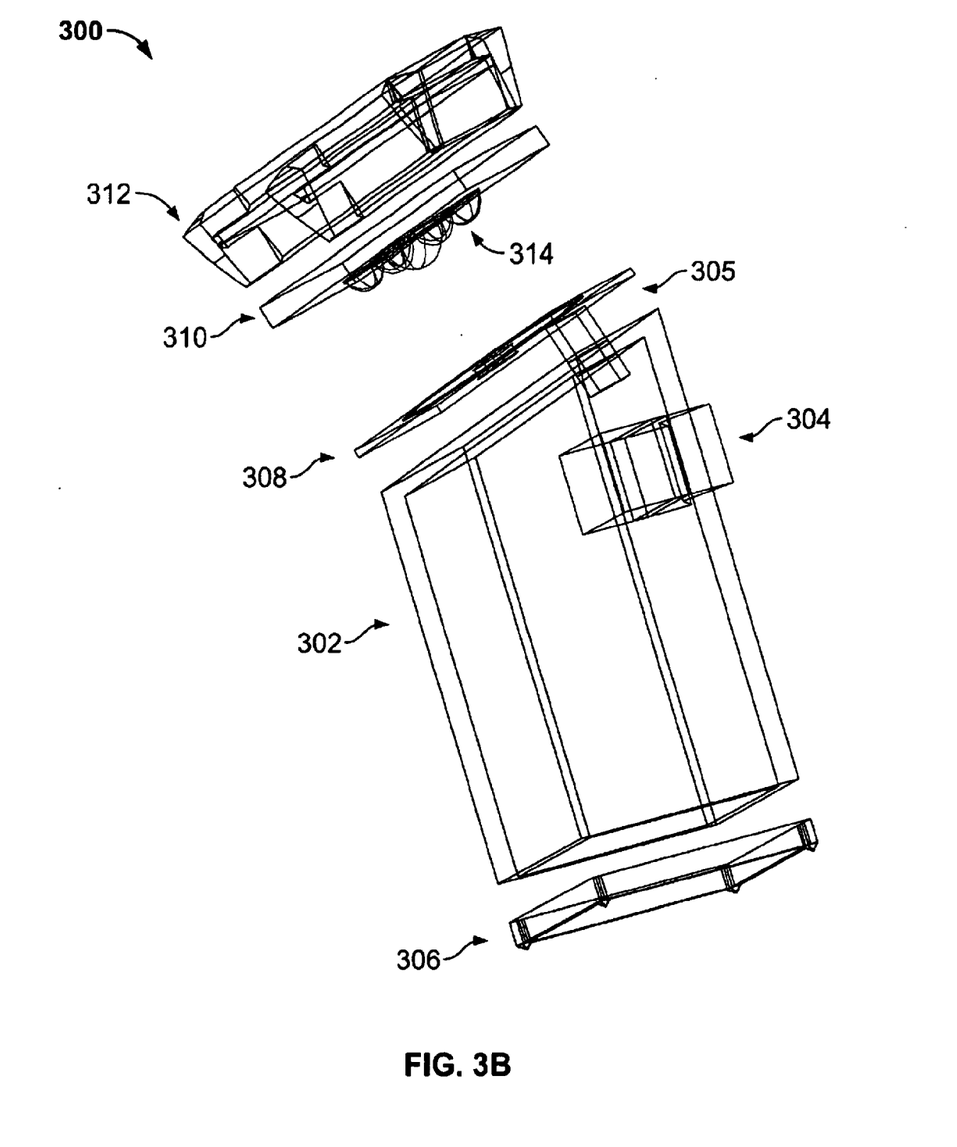
FIG. 3B is a three-dimensional view showing certain internal components of the pointing device internal assembly shown in FIG. 3A.

FIG. 3A is a three-dimensional view of a pointing device internal assembly, according to one implementation. FIG. 3B is a three-dimensional view showing certain internal components of the pointing device internal assembly shown in FIG. 3A. In the implementation shown in these figures, a pointing device internal assembly 300 includes a housing 302, a click button 304, a cover 306, a pressure sensor 308, an actuator 310, and a retainer 312. The pointing device internal assembly 300 shown in FIGS. 3A and 3B is an example of a type of assembly contained within the hand-held pointing device 102 shown in FIG. 1 used for controlling the motion of a pointer on a display screen. The actuator 310 contains a number of protrusions 314 located on its lower surface. In one implementation, the cover 306, the housing 302, the actuator 310, and the retainer 312 are made of an aluminum material. The housing 302 is hollow and elongate in shape. The cover 306 fits along the bottom of the housing 302. A top surface 305 of the housing 302 is shown as a sloped surface. The click button 304 is attached to one side of the housing 302. (This is shown more clearly in FIG. 3B.) In one implementation, the click button 304 is a conventional rocker switch. With such a switch, a user can use only a single finger, such as an index finger, to initiate both left- and right-click operations. In one implementation, a user may use a thumb to manipulate the actuator 310 and an index finger to manipulate the click button 304.

The pressure sensor 308 shown in FIG. 3A is contained on a substantially planar surface and has a pressure-sensitive film. The pressure-sensitive film contains two regions: an active pressure-sensitive region, and an inactive region. The active pressure-sensitive region contains a number of pressure-sensitive zones that are interconnected. In one implementation, such as the one shown in FIG. 2B, there are four such pressure-sensitive zones. In another implementation, there are eight pressure-sensitive zones. Each zone is associated with a distinct motion direction for the pointer on the display screen, such as north, west, south, and east.

The actuator 310 pivots centrally on the sensor 308 when pressure is applied by a thumb or finger of a user. As a result, the protrusions 314 come in contact with the pressure-sensitive zones on the pressure sensor 308. In one implementation, the protrusions 314 are spherical in shape, and are made of a plastic material. Because the actuator 310 swivels freely about its center on the housing 302, a retainer 312 is placed around the actuator plate. In one implementation, the retainer 312 is spring loaded to allow the actuator 310 to continue to swivel about its center, while maintaining a limit on the range of motion to keep the actuator 310 in position on the top of the housing 302.

When the protrusions 314 come in contact with the pressure-sensitive zones on the pressure sensor 308, each of the pressure-sensitive zones generate a voltage that is proportional to the pressure exerted by the protrusions 314 that come in contact with these zones. These voltages may be amplified through an amplifier circuit, such as may be provided by a printed circuit board located within the housing 302. The amplified voltages are then routed to a microcontroller. In one implementation, the microcontroller is located within the housing 302. In another implementation, the microcontroller is located separately from the pointing device internal assembly 300 shown in FIGS. 3A and 3B and is coupled to the assembly 300 by means of a wired or wireless connection.

The microcontroller uses an algorithm provided by a program, such as a firmware program, to receive the signals coming from the pressure-sensitive zones on the pressure sensor 308 and determine a direction and a speed of motion of the pointer on the display screen. This determination is based on the comparison of the signals that are provided by the various pressure-sensitive zones. In one implementation, the microcontroller uses a vector calculation to make the determination of direction, such as the form of vector calculation describe earlier in the description of FIG. 1. The speed of the pointer is proportional to the intensity of the pressure exerted on the actuator 310. In one implementation, the microcontroller also processes the input information from a click button, such as the click button 304 shown in FIGS. 3A and 3B, to determine the click right- and left-click operations. The microcontroller routes motion information to a computing device, such as the computing device 110 shown in FIG. 1, which controls motion of a pointer on a display screen.

Figure 4:
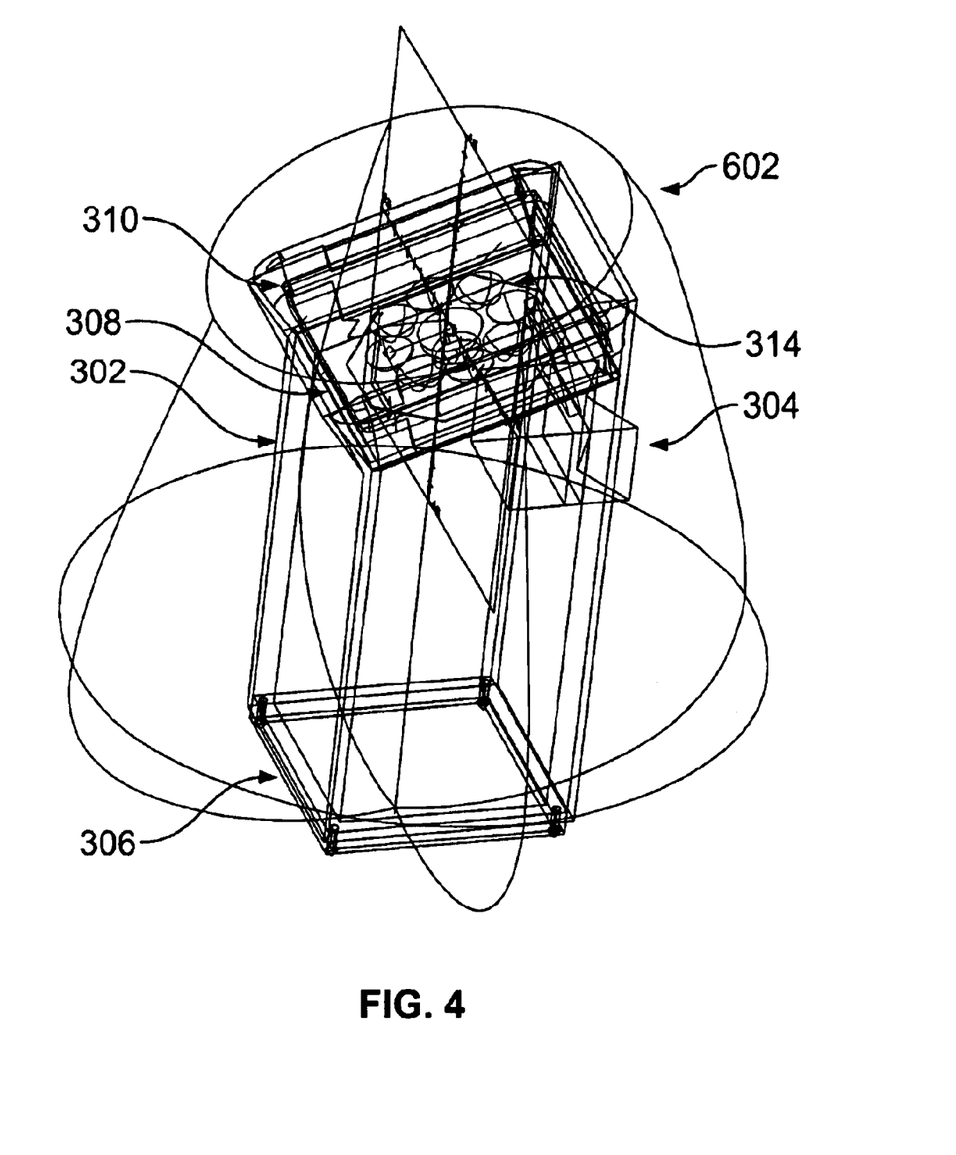
FIG. 4 is another three-dimensional view showing certain internal components of the pointing device internal assembly shown in FIG. 3A.

FIG. 4 is another three-dimensional view showing certain internal components of the pointing device internal assembly shown in FIG. 3A contained in an external shell 602. FIG. 4 shows the click button 304 as a rocker switch. The rocker switch can be toggled to one side to initiate a left click, and can be toggled to the other side to initiate a right click. A user need only use a single finger to manipulate the click button 304 for both left- and right-click operations. The actuator 310 is shown as having a sloped surface. In addition, the actuator 310 shown in FIG. 4 contains eight protrusions 314 located on its bottom surface. These protrusions 314 come into contact with one or more of the eight pressure-sensitive zones on pressure sensor 308 when the user exerts pressure upon the actuator 310.

Figure 5:
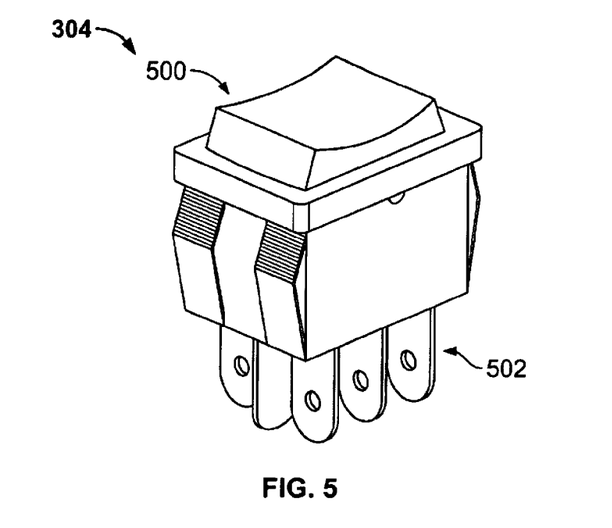
FIG. 5 is a three-dimensional view of the click button shown in FIGS. 3A and 3B.

FIG. 5 is a three-dimensional view of the click button shown in FIGS. 3A and 3B. The click button 304 contains a toggle switch 500 and connectors 502. The connectors 502 are used to couple the click button 304 with the housing 302 shown in FIGS. 3A and 3B, so that the output signals from the click button 304 may be routed to the microcontroller. The toggle switch 500 is capable of being toggle-switched to either the right- or left-hand sides. A user may engage the toggle switch 500 by using only a single finger or thumb. When the toggle switch 500 is pressed to one side, a left-click operation may be initiated. When the toggle switch 500 is pressed to the other side, a right-click operation is initiated. In one implementation, the click button 304 is a conventional rocker switch.

Figure 6A:
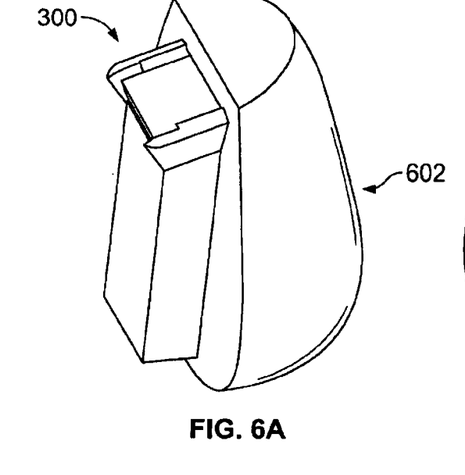
FIG. 6A is a three-dimensional view of a pointing device, according to one implementation.

FIG. 6A is a three-dimensional view of a pointing device, according to one implementation. In this implementation, the pointing device internal assembly 300 from FIGS. 3A and 3B is shown as being contained within an external shell 602. The pointing device internal assembly 300 is contained within the external shell 602, such that a user may manipulate both the actuator 310 and the click button 304 and also hold the external shell 602 in the palm of a hand. The user may manipulate the actuator 310 with one digit (e.g., finger or thumb), and manipulate the click button 304 with another digit. By manipulating the actuator 310, the user is able to control the motion of a pointer on a display screen, and by manipulating the click button 304, the user is able to control right- and left-click operations. In various implementations, the external shell 602 is made of a soft, flexible material, such as rubber.

Figure 6B:
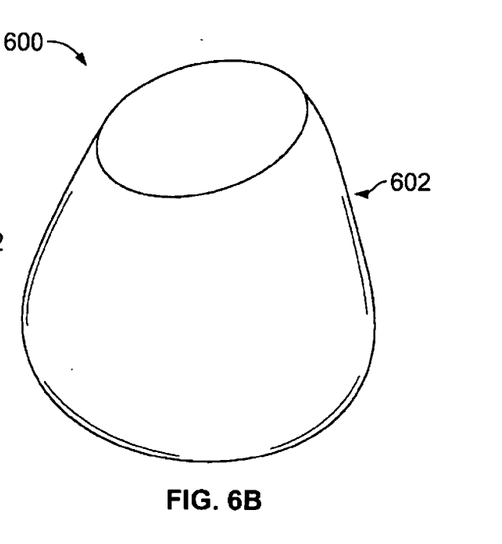
FIG. 6B is a three-dimensional view of the pointing device shown in FIG. 6A.

FIG. 6B is a three-dimensional view of the pointing device shown in FIG. 6A. In FIG. 6B, the external shell 602 of a pointing device 600 is shown. The pointing device 600 is capable of being held in the user's hand during operation, and may also be strapped across the back of the user's hand when the user is typing. Because of the ambidextrous structure, a user may use the pointing device 600 in either the left or right hand.

Figure 7A:
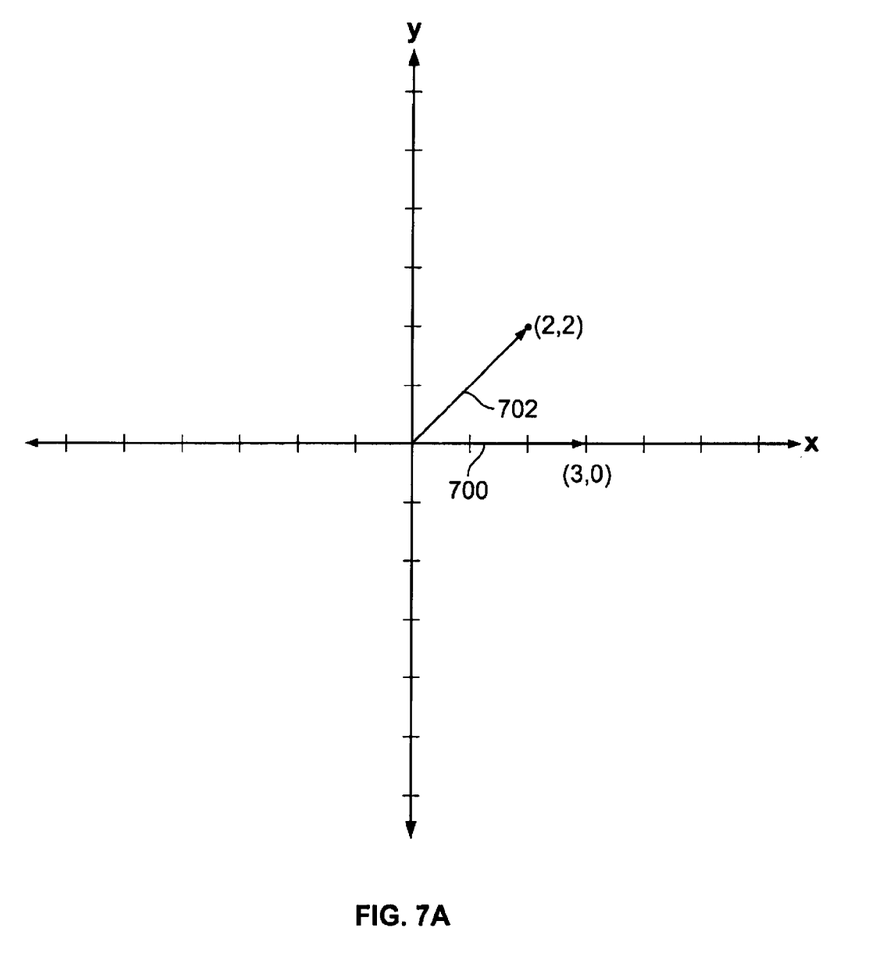
FIG. 7A is a graphical diagram showing an example of two component signal vectors.

FIG. 7A is a graphical diagram showing an example of two component signal vectors. In one implementation, these two component signal vectors are used by a microcontroller to determine a resultant vector for the direction of motion of a pointer and/or the speed of motion of the pointer. In this implementation, an algorithm similar to the one described in regards to FIG. 2B may be used. However, in the example shown in FIG. 7A, the two component signal vectors correspond to signals received from a pressure sensor containing eight, rather than four, pressure-sensitive zones. The pointing device internal assembly 300 shown in FIG. 3A, FIG. 3B, and FIG. 4 contains eight such pressure-sensitive zones.

When pressure is applied by the actuator 310 to the pressure sensor 308, the ones of the pressure-sensitive zones that have been pressed upon by the protrusions 314 of the actuator 310 will generate an output voltage of a certain magnitude. These output voltages may be amplified, and are then sent to a microcontroller for processing. The microcontroller represents each of these output voltages as a component signal vector. In an assembly having eight pressure-sensitive zones, any such represented signal vectors could have directions of zero, forty five, ninety, one hundred thirty five, one hundred eighty, two hundred twenty five, two hundred seventy, or three hundred fifteen degrees, as measured from the x-axis. As shown in example in FIG. 7A, there are two such component signal vectors 700 and 702. Each of these component signal vectors corresponds to a signal received from one of the eight pressure-sensitive zones. The component signal vector 700 is a vector having x- and y-coordinates of (3, 0). The component signal vector 700 has a relative magnitude of three and a direction of zero degrees as measured from the x-axis. The magnitude corresponds to the relative amount of pressure that was applied to the pressure-sensitive zone associated with the component signal vector 700. The component signal vector 702 is a vector having x- and y-coordinates of (2, 2). The component signal vector 702 has a relative magnitude of two multiplied by the square root of two and a direction of forty-five degrees as measured from the x-axis.

Figure 7B:
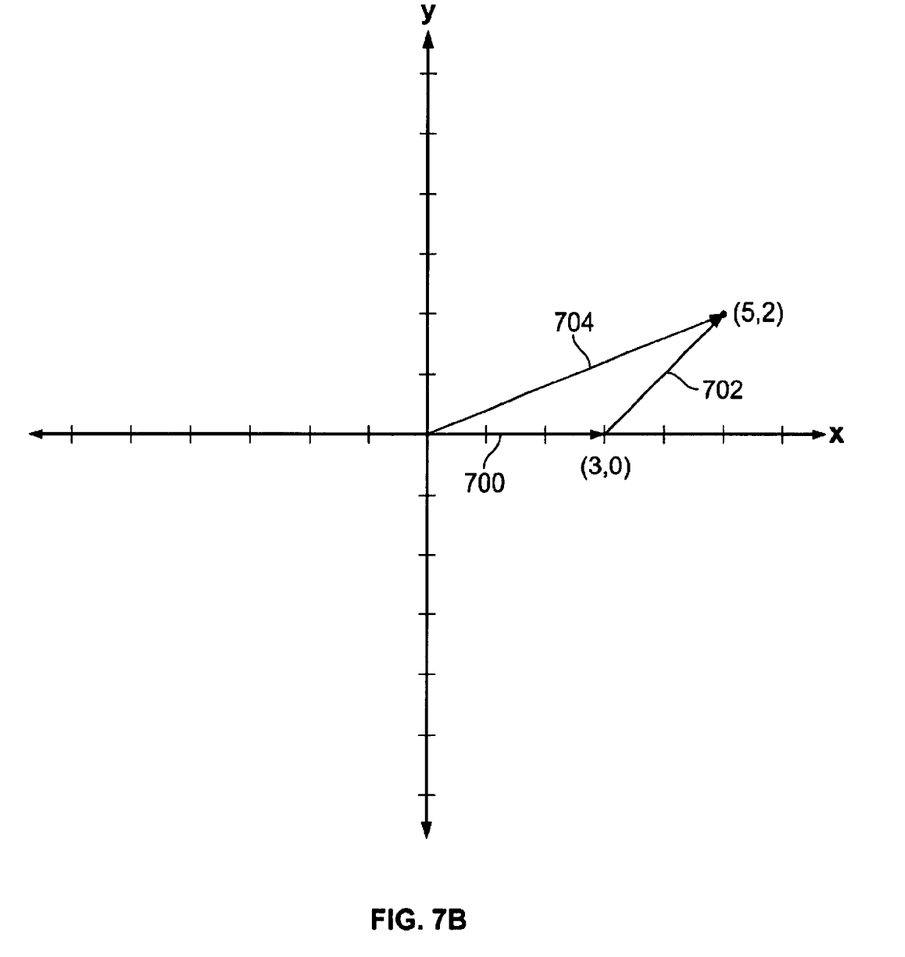
FIG. 7B is a graphical diagram showing a resultant vector calculated from the component vectors shown in FIG. 7A.

FIG. 7B is a graphical diagram showing a resultant vector calculated from the component vectors shown in FIG. 7A. In one implementation, the microcontroller uses a vector calculation to add the component signal vectors 700 and 702 to determine a resultant vector. As shown in FIG. 7B, the addition of the component signal vectors 700 and 702 results in the resultant vector 704. The resultant vector 704 is a vector having x- and y-coordinates of (5, 2). The resultant vector 704 has a relative magnitude of the square root of twenty nine and a direction of $\tan^{-1}(2/5)$ in degrees, as measured from the x-axis. The resultant vector 704 determines the direction of motion. In one implementation, the microcontroller will send information about the resultant vector 704 to a computing device, such as the computing device 110 shown in FIG. 1. The computing device will then cause motion of a pointer on a display screen in the direction indicated by the direction of the resultant vector 704. In one implementation, the computing device will also cause a speed of motion of the pointer as indicated by the magnitude of the resultant vector 704. In general, the speed of motion of the pointer is determined by the amount of pressure applied to the actuator, such as the actuator 310 shown in FIGS. 3A and 3B.

A number of implementations of the invention have been described. Nevertheless, it will be understood that various modifications may be made without departing from the spirit and scope of the invention. Accordingly, other embodiments are within the scope of the following claims.

What is claimed is:

1. A hand-held device to control motion of a pointer on a display screen, the device comprising:
   a shell capable of being held by a hand;
   a pressure sensor having pressure-sensitive zones that are each associated with a direction of motion of the pointer on the display screen; and
   an actuator positioned to be manipulated by a digit of the hand holding the shell, and that when manipulated presses against at least one of the pressure-sensitive zones causing each pressure-sensitive zone to generate a signal having a magnitude that is proportional to an amount of pressure exerted on that zone at a particular point in time, and further causing the pointer to move on the display screen in any angular direction that is determined both by the direction of motion associated with and also the magnitude of the signal generated by the at least one of the pressure-sensitive zones against which the actuator is pressed.

2. The hand-held device of claim 1, wherein the actuator, when manipulated, presses against at least one of the pressure-sensitive zones to further cause the pointer to move on the display screen with a speed determined by the amount of pressure with which the actuator is pressed against the at least one of the pressure-sensitive zones.

3. The hand-held device of claim 1, wherein each of the pressure-sensitive zones, when operable, generate a voltage signal according to a relative amount of pressure applied to each of the pressure-sensitive zones.

4. The hand-held device of claim 1, wherein the device further includes a click button capable of being manipulated by a second digit of the hand holding the shell.

5. The hand-held device of claim 4, wherein the click button has a toggle switch for left- and right-click operations.

6. The hand-held device of claim 1, wherein the pressure sensor has at least four pressure-sensitive zones that are each associated with a direction of motion of the pointer on the display screen, and wherein the actuator contains at least four protrusions that each can press against one of the pressure-sensitive zones when the actuator is manipulated to cause the pointer to move on the display screen in a direction determined by the direction of motion associated with the pressure-sensitive zones against which the protrusions are pressed.

7. The hand-held device of claim 6, wherein the pressure sensor has at least eight pressure-sensitive zones that are each associated with a direction of motion of the pointer on the display screen, and wherein the actuator contains at least eight protrusions that each can press against one of the pressure-sensitive zones when the actuator is manipulated to cause the pointer to move on the display screen in a direction determined by the direction of motion associated with the pressure-sensitive zones against which the protrusions are pressed.

8. The hand-held device of claim 1, wherein the shell is a soft, flexible shell.

9. The hand-held device of claim 1, wherein a top surface of the actuator is substantially planar.

10. The hand-held device of claim 1, wherein the actuator, when manipulated to press against at least one of the pressure-sensitive zones, causes the pointer to move on the display screen in any angular direction that is determined from a resultant vector calculated from individual component vectors that are derived from the signals generated by each of the pressure-sensitive zones.

11. The hand-held device of claim 1, wherein the pressure sensor has pressure-sensitive zones that are each made of piezoresistive material.

12. The hand-held device of claim 1, wherein the angular direction comprises a direction between 0 and 359 degrees.

13. An actuator usable within a hand-held pointing device to control a pointer on a display screen, the actuator comprising:
   a top surface capable of being manipulated by a digit of a hand to cause the actuator to swivel about a pivot point; and
   a bottom surface having at least four protrusions spaced apart in a polygonal pattern that are associated with at least four pressure zones on a pressure-sensitive film, such that when the actuator swivels about the pivot point, each pressure zone on the pressure-sensitive film generates a signal having a magnitude that is proportional to an amount of pressure exerted on that pressure zone by one of the protrusions at a particular point in time, causing the pointer to move on the display screen in any angular direction determined by both a direction of motion associated with and also the magnitude of the signal generated by each pressure zone against which the protrusions are pressed.

14. The actuator of claim 13, wherein each protrusion is capable of being pressed against a pressure zone on a pressure-sensitive film to cause the pointer to move on the display screen with a speed determined by the amount of pressure with which the protrusions are pressed against the pressure zones.

15. The actuator of claim 13, wherein the protrusions are equally spaced apart in a polygonal pattern.

16. The actuator of claim 13, wherein the protrusions include at least eight protrusions.

17. The actuator of claim 13, wherein the top surface is a substantially planar surface.

18. The actuator of claim 13, wherein the actuator swiveling about the pivot point causes the pointer to move on the display screen in any angular direction that is determined from a resultant vector calculated from individual component vectors that are derived from the signals generated by each of the pressure zones.

19. The actuator of claim 13, wherein the pressure-sensitive film has at least four pressure zones that are each made of piezoresistive material.

20. The actuator of claim 13, wherein the angular direction comprises a direction between 0 and 359 degrees.

21. A method for controlling motion of a pointer on a display screen through operation of a hand-held pointing device, the method comprising:

detecting amounts of pressure applied to pressure-sensitive zones on a pressure sensor when at least one protrusion of an actuator presses against at least one of the pressure-sensitive zones, the pressure sensor and the actuator being contained within the hand-held pointing device, wherein such detecting includes processing signals generated by each of the pressure-sensitive zones that have signal magnitudes proportional to the amounts of pressure applied to the zones at a particular point in time;

determining a direction of motion that is based on both a sensing direction of motion associated with and also on the magnitude of the signal generated by each pressure-sensitive zone against which the at least one protrusion is pressed; and sending information relating to the direction of motion to a computing device to cause motion of the pointer on the display screen.

22. The method of claim 21, wherein the method further comprises:

determining a speed of motion based on the amount of pressure applied to each of the pressure-sensitive zones; and sending information relating to the speed of motion to the computing device.

23. The method of claim 21, wherein the method further comprises:

detecting input from a click button contained within the pointing device;

determining a click operation based on the input from the click button; and sending information relating to the click operation to the computing device.

24. The method of claim 21, wherein determining the direction of motion includes determining a resultant vector that is calculated from individual component vectors derived from the signals generated by each of the pressure-sensitive zones.

25. The method of claim 21, wherein determining the direction of motion includes determining an angular direction of motion between 0 and 359 degrees.

* * * * *